US012125280B2

United States Patent
Kook (10) Patent No.: US 12,125,280 B2
(45) Date of Patent: Oct. 22, 2024

(54) DANCE MATCHING METHOD AND SYSTEM (71) Applicant: SIDEWALK ENTERTAINMENT CO., LTD, Seoul (KR)

(72) Inventor: Ki Bong Kook, Gyeonggi-do (KR)

(73) Assignee: SIDEWALK ENTERTAINMENT CO., LTD, Seoul (KR)

( * ) Notice: Subject to any disclaimer, the term of this patent is extended or adjusted under 35 U.S.C. 154(b) by 0 days.

(21) Appl. No.: 18/558,627

(22) PCT Filed: Apr. 20, 2022

(86) PCT No.: PCT/KR2022/005641
§ 371 (c)(1),
(2) Date: Nov. 2, 2023

(87) PCT Pub. No.: WO2022/239988
PCT Pub. Date: Nov. 17, 2022

(65) Prior Publication Data
US 2024/0233378 A1    Jul. 11, 2024

(30) Foreign Application Priority Data

May 13, 2021 (KR) .................. 10-2021-0062000
May 13, 2021 (KR) .................. 10-2021-0145801

(51) Int. Cl.
*G06K 9/62* (2022.01)
*A63F 13/213* (2014.01)
(Continued)

(52) U.S. Cl.
CPC ............ *G06V 20/48* (2022.01); *A63F 13/213* (2014.09); *A63F 13/65* (2014.09); *A63F 13/814* (2014.09); *G06V 20/46* (2022.01); *G06V 40/23* (2022.01)

(58) Field of Classification Search
None
See application file for complete search history.

(56) References Cited

U.S. PATENT DOCUMENTS

| 11,924,513 B2 * | 3/2024 | Wang .................. H04N 21/4223 |
| 2021/0117679 A1 * | 4/2021 | Beom .............. H04N 21/42202 |
| 2022/0072433 A1 * | 3/2022 | Wang ...................... G06V 10/75 |

FOREIGN PATENT DOCUMENTS

| JP | 6137935 B2 * | 5/2017 |
| KR | 20000024237 A * | 5/2000 |

(Continued)

OTHER PUBLICATIONS

International Search Report and written opinion of corresponding PCT Application No. PCT/KR2022/005641 mailing on Jul. 20, 2022.

(Continued)

*Primary Examiner* — Feng Niu
(74) *Attorney, Agent, or Firm* — IDEA Intellectual Limited; Margaret A. Burke; Sam T. Yip (57) ABSTRACT

A dance matching method, according to one embodiment of the present invention, which relates to a method for evaluating a dance of a user on the basis of a reference song video having a dance of multiple dancers, may comprises the steps in which: a group dance part extraction unit extracts a group dance part from the reference song video under a preset dance extraction condition; a song extraction unit extracts a song part corresponding to the extracted group dance part; a communication unit transmits the song part to an electronic device of the user so that the extracted song part is played back in the electronic device; the communication unit receives a user dance video from the electronic device while the song part is being played back in the electronic device; a matching unit calculates a matching rate between a dance of the user in the user dance video and a dance of the dancers in the reference song video; and the communication unit transmits the matching rate to the electronic device.

9 Claims, 8 Drawing Sheets

(51) Int. Cl.
    *A63F 13/65*     (2014.01)
    *A63F 13/814*     (2014.01)
    *G06V 20/40*     (2022.01)
    *G06V 40/20*     (2022.01)

(56) References Cited

FOREIGN PATENT DOCUMENTS

| | | | |
|---|---|---|---|
| KR | 10-2014-0135272 A | | 11/2014 |
| KR | 10-2016-0093131 A | | 8/2016 |
| KR | 10-2018-0007885 A | | 1/2018 |
| KR | 10-1936692 B1 | | 1/2019 |
| KR | 10-2019-0070590 A | | 6/2019 |
| KR | 20200119042 A | * | 10/2020 |
| KR | 10-2324579 B1 | | 11/2021 |

OTHER PUBLICATIONS

Notice of Allowance of corresponding KR Application No. 10-2021-0062000 mailing on Aug. 17, 2021.

* cited by examiner

FIG. 6 aaaaaaaaaaaaaaaaaaa bbbbbbbbbbb cccccccccccccccccccccccc ddddddddddddddddddd ~ K1 eeeeeeeeeeeeeeeeeee fffffffffffffffffff ggggggggggggggggggggggg ddddddddddddddddddd ~ K2 hhhhhhhhhhhhh bbbbbbbbbbb ddddddddddddddddddd ~ K3

DANCE MATCHING METHOD AND SYSTEM

TECHNICAL FIELD

The present disclosure relates to a dance matching method and system. More particularly, the present disclosure relates to a dance matching method and system for evaluating a dance of a user on the basis of a reference song video of a dance of multiple dancers.

BACKGROUND ART

A dance game started with Konami's Dance Dance Revolution, and a dance training device displays symbols marked on a platform, which is a hardware device, on a screen and a user follows the symbols continuously and thus takes actions similar to dance movements.

However, these dance movements are dance movements made by moving between platform symbols, regardless of the actual dance of the corresponding music.

The dance training device makes a character copy dance movements, and the user follows dance movements of the character. Furthermore, there is a dance training device using an arrow platform.

The dance training device copies dance movements by adjusting positions and timing of arrows on the arrow platform.

The user can follow the dance movements according to lighting positions and timing of the arrows that appear on the arrow platform. The dance training device determines the degree of matching to which the user steps on the arrow platform according to the arrow lighting positions and timing, and displays a score corresponding to the degree of matching.

The dance training device ranks and displays the user's score and other users' scores to stimulate the user's competitive spirit. Since the dance training device uses the arrow platform, it is difficult to copy upper body movements among dance movements.

Recently, K-pop has become popular around the world, and cover dance culture that imitates the dances of idol groups was born as a new Korean Wave, and cover dance videos have been shared on YouTube's video sharing site.

Conventional ways to learn a cover dance include watching and following videos on video sharing sites, and taking lessons at dance academies.

In the meantime, Korean Patent No. 10-1936692 B1 (3 Jan. 2019) discloses DANCE TRAINING APPARATUS AND METHOD USING AUTOMATIC GENERATION OF DANCE KEY MOTION.

However, the patent only focuses on calculating the difference between reference movement information and comparison movement information, and has limitations in easily providing a number of songs to a user.

DISCLOSURE

Technical Problem

Accordingly, the present disclosure has been made keeping in mind the above problems occurring in the related art, and the present disclosure is directed to providing a dance matching method and system capable of easily editing various songs and providing the same to a user.

It is to be understood that technical problems to be solved by the present disclosure are not limited to the aforementioned technical problems and other technical problems which are not mentioned will be apparent from the specification and the accompanying drawings to those skilled in the art to which the present disclosure pertains.

Technical Solution

According to an embodiment of the present disclosure, there is a dance matching method for evaluating a dance of a user on the basis of a reference song video of a dance of multiple dancers, the dance matching method including: extracting, by a group dance part extraction unit, a group dance part from the reference song video under a preset dance extraction condition; extracting, by a song extraction unit, a song part corresponding to the extracted group dance part; transmitting, by a communication unit, the song part to an electronic device of the user so that the electronic device plays the extracted song part; receiving, by the communication unit, a user dance video from the electronic device while the electronic device plays the song part; calculating, by a matching unit, a matching rate between a dance of the user in the user dance video and a dance of a dancer in the reference song video; and transmitting, by the communication unit, the matching rate to the electronic device.

Advantageous Effects

According to the dance matching method according to an embodiment of the present disclosure, various songs uploaded in real time can be easily edited and provided to a user.

It is to be understood that effects that may be obtained from the present disclosure will not be limited to only the above described effects and other effects which are not mentioned will be apparent from the specification and the accompanying drawings to those skilled in the art to which the present disclosure pertains.

DESCRIPTION OF THE REFERENCE NUMERALS IN THE DRAWINGS

100: control unit
200: communication unit

300: memory unit
400: input unit
500: display unit

MODE FOR INVENTION

Hereinafter, embodiments of the present disclosure will be described in detail with reference to the accompanying drawings. Meanwhile, the technical idea of the present disclosure is not limited to the suggested embodiments, and those skilled in the art and understanding the technical idea of the present disclosure could easily suggest other embodiments which fall within the scope of the idea of the present disclosure of a retrogressive disclosure through addition of another component, modification, and deletion without departing from the scope of the idea of the present disclosure. The suggested embodiments also fall within the scope of the idea of the present disclosure.

According to an embodiment of the present disclosure, there is a dance matching method for evaluating a dance of a user on the basis of a reference song video of a dance of multiple dancers, the dance matching method including: extracting, by a group dance part extraction unit, a group dance part from the reference song video under a preset dance extraction condition; extracting, by a song extraction unit, a song part corresponding to the extracted group dance part; transmitting, by a communication unit, the song part to an electronic device of the user so that the electronic device plays the extracted song part; receiving, by the communication unit, a user dance video from the electronic device while the electronic device plays the song part; calculating, by a matching unit, a matching rate between a dance of the user in the user dance video and a dance of a dancer in the reference song video; and transmitting, by the communication unit, the matching rate to the electronic device.

In addition, the preset dance extraction condition may be a condition for extracting the group dance part on the basis of dance matching rates between the multiple dancers in the reference song video.

In addition, the group dance part extraction unit may be configured to calculate the dance matching rates for all playback sections of the reference song video, and extract a reference matching rate, which is a reference for extracting the group dance part, on the basis of the dance matching rates for the all playback sections of the reference song video. The preset dance extraction condition may be a condition for extracting a dance part having the dance matching rates equal to and greater than the reference matching rate as the group dance part.

In addition, the preset dance extraction condition may be a condition for extracting, when there are a plurality of the dance parts having the dance matching rates equal to and greater than the reference matching rate, a dance part with the longest playback duration as the group dance part, among the plurality of the dance parts.

In addition, the preset dance extraction condition may be a condition for extracting, as the group dance part, any one of the sections with the highest lyrics repetition rate in the all playback sections of the reference song video.

In addition, the preset dance extraction condition may be a condition for extracting the group dance part on the basis of the dance matching rates between the multiple dancers in the reference song video, among the sections with the highest lyrics repetition rate.

In addition, the song extraction unit may be configured to extract the song part that starts a preset period of time before a start time point of the extracted group dance part and ends a preset period of time after an end time point of the group dance part.

In addition, the matching unit may be configured to calculate the matching rate between the dance of the user and a reference dance in the reference song video only for the user dance video in the group dance part included in the user dance video in the song part.

According to another embodiment of the present disclosure, there is a dance matching system for evaluating a dance of a user on the basis of a reference song video of a dance of multiple dancers, the dance matching system including: a group dance part extraction unit configured to extract a group dance part from the reference song video under a preset dance extraction condition; a song extraction unit configured to extract a song part corresponding to the extracted group dance part; a communication unit configured to transmit the song part to an electronic device of the user so that the electronic device plays the extracted song part, and to receive a user dance video from the electronic device while the electronic device plays the song part; and a matching unit configured to calculate a matching rate between a dance of the user in the user dance video and a dance of a dancer in the reference song video.

Elements having the same function within the scope of the same technical idea shown in the drawing of each embodiment are described using the same reference number.

Figure 1:
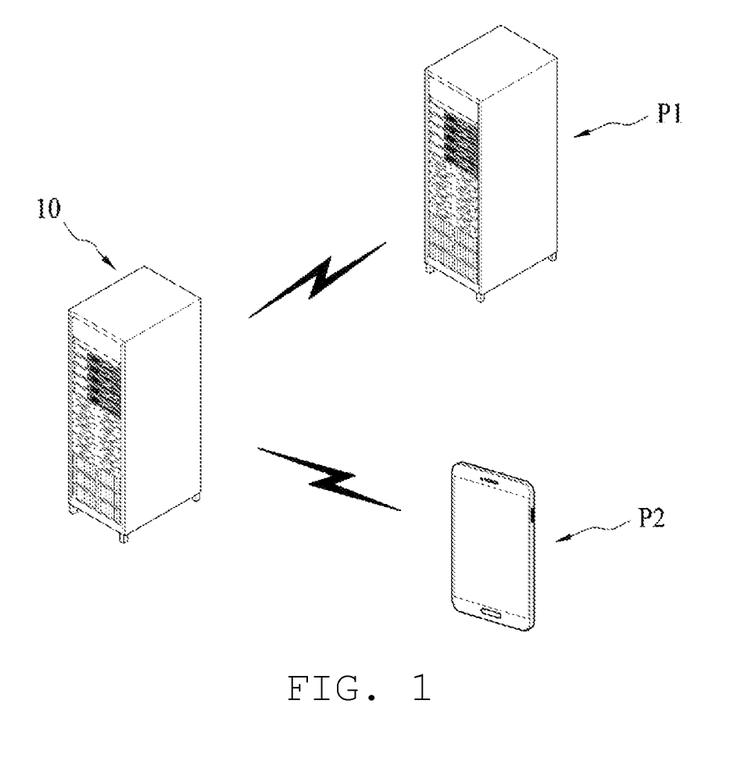
FIG. 1 is a schematic diagram illustrating a dance matching system of a dance matching method communicating with other devices, according to an embodiment the present disclosure.

FIG. 1 is a schematic diagram illustrating a dance matching system of a dance matching method communicating with other devices, according to an embodiment the present disclosure.

Figure 2:
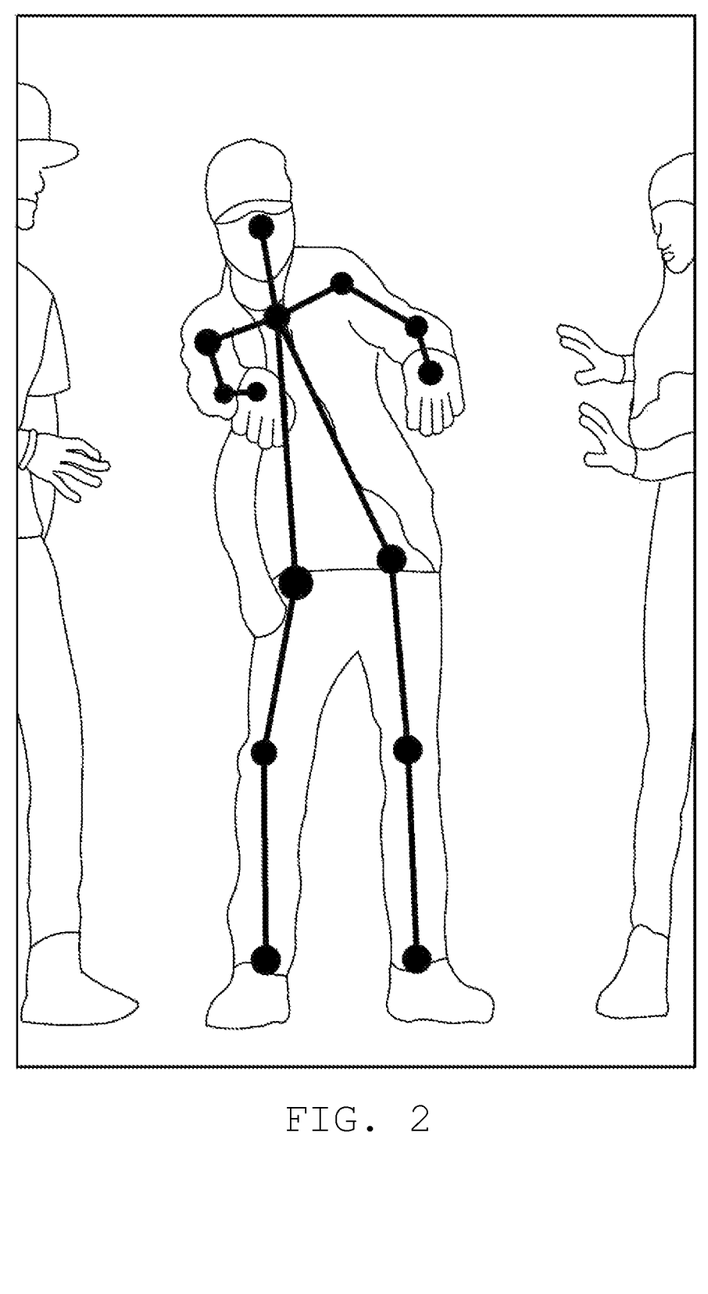
FIG. 2 is a schematic diagram illustrating a step of calculating a matching rate in a dance matching method according to an embodiment of the present disclosure.

FIG. 2 is a schematic diagram illustrating a step of calculating a matching rate in a dance matching method according to an embodiment of the present disclosure.

Figure 3:
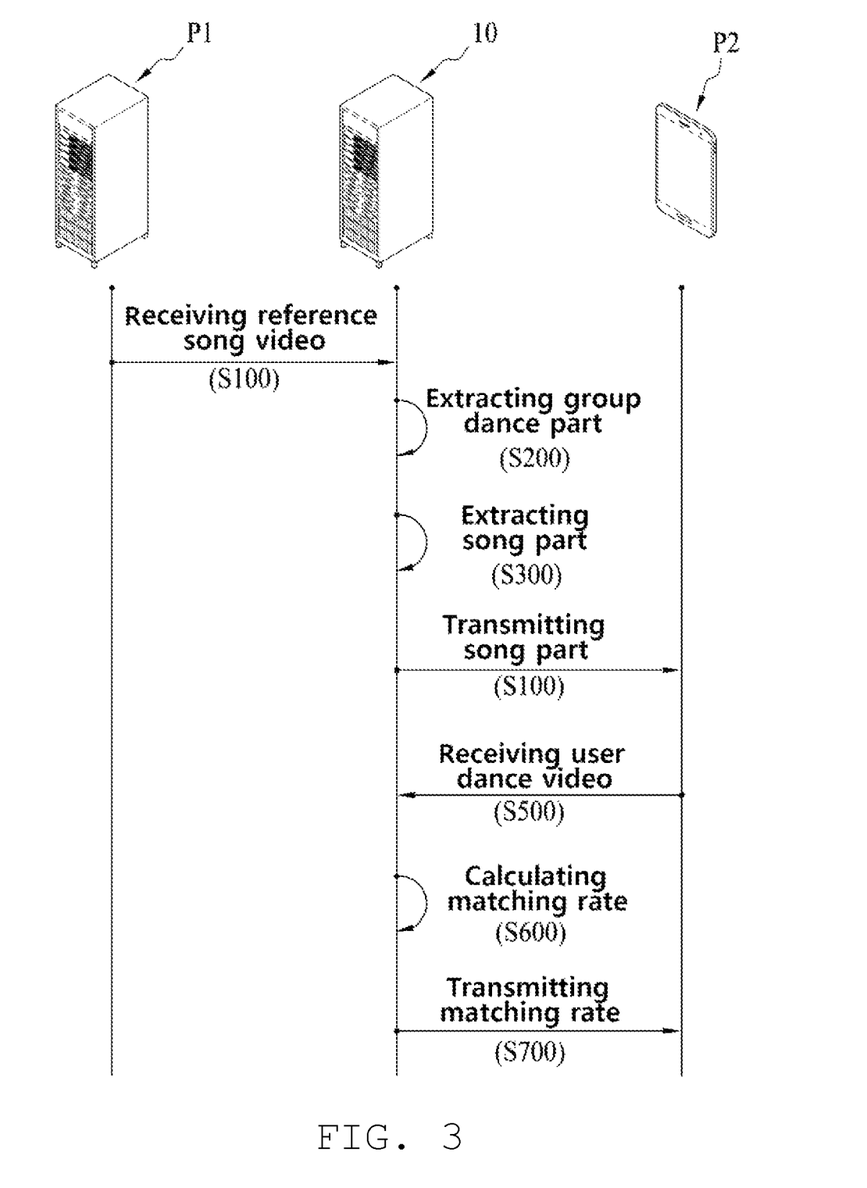
FIG. 3 is a schematic flowchart of a dance matching method according to an embodiment of the present disclosure.

FIG. 3 is a schematic flowchart of a dance matching method according to an embodiment of the present disclosure.

Figure 4:
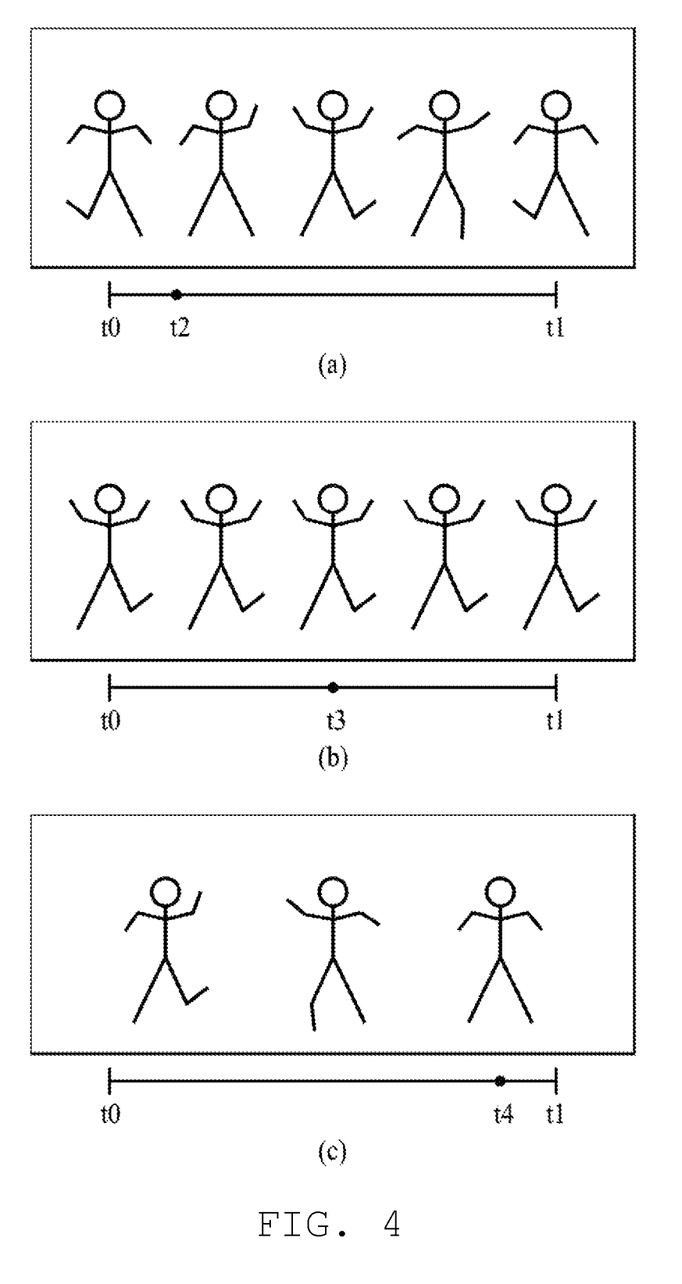
FIG. 4 is a schematic diagram illustrating a reference song video in a dance matching method according to an embodiment of the present disclosure.

FIG. 4 is a schematic diagram illustrating a reference song video in a dance matching method according to an embodiment of the present disclosure.

Figure 5:
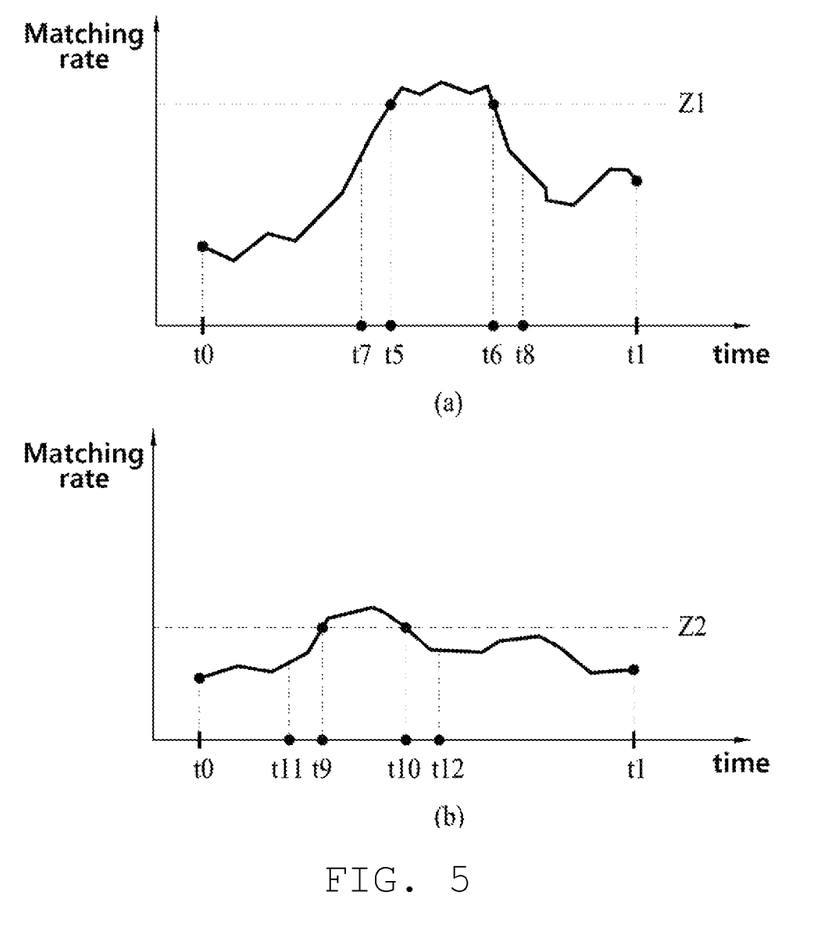
FIGS. 5 and 6 are schematic graphs illustrating a step of extracting a group dance part in a dance matching method according to an embodiment of the present disclosure.
Figure 6:
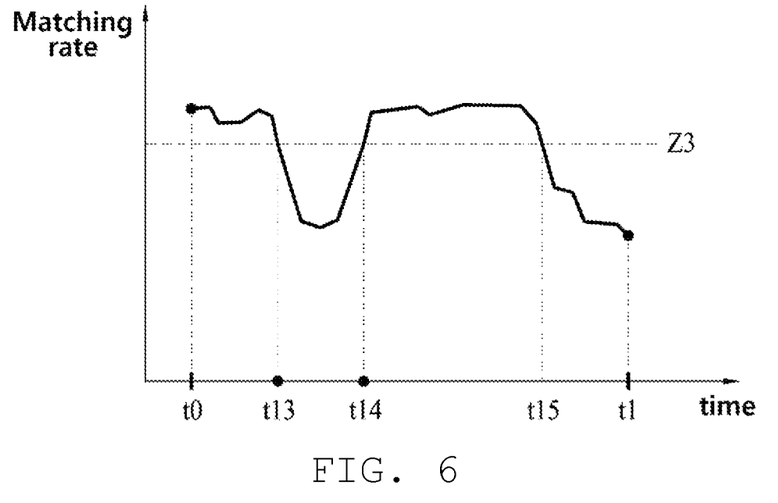

FIGS. 5 and 6 are schematic graphs illustrating a step of extracting a group dance part in a dance matching method according to an embodiment of the present disclosure.

Figure 7:
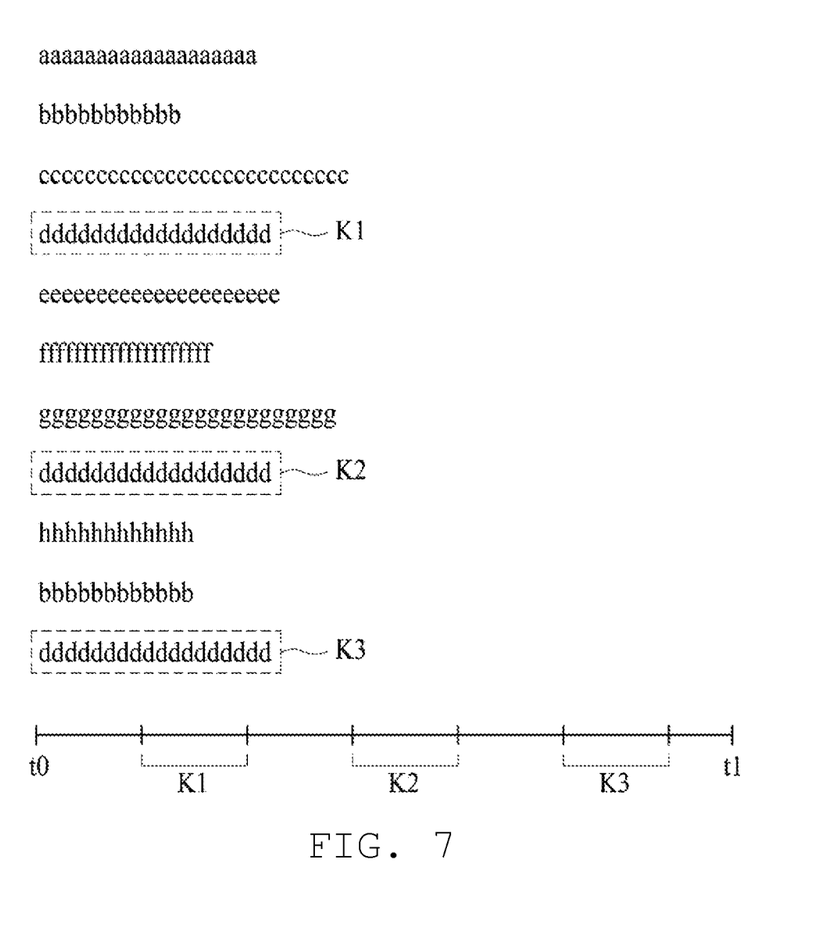
FIG. 7 is a schematic diagram illustrating a step of extracting a group dance part in a dance matching method according to an embodiment of the present disclosure.

FIG. 7 is a schematic diagram illustrating a step of extracting a group dance part in a dance matching method according to an embodiment of the present disclosure.

Figure 8:
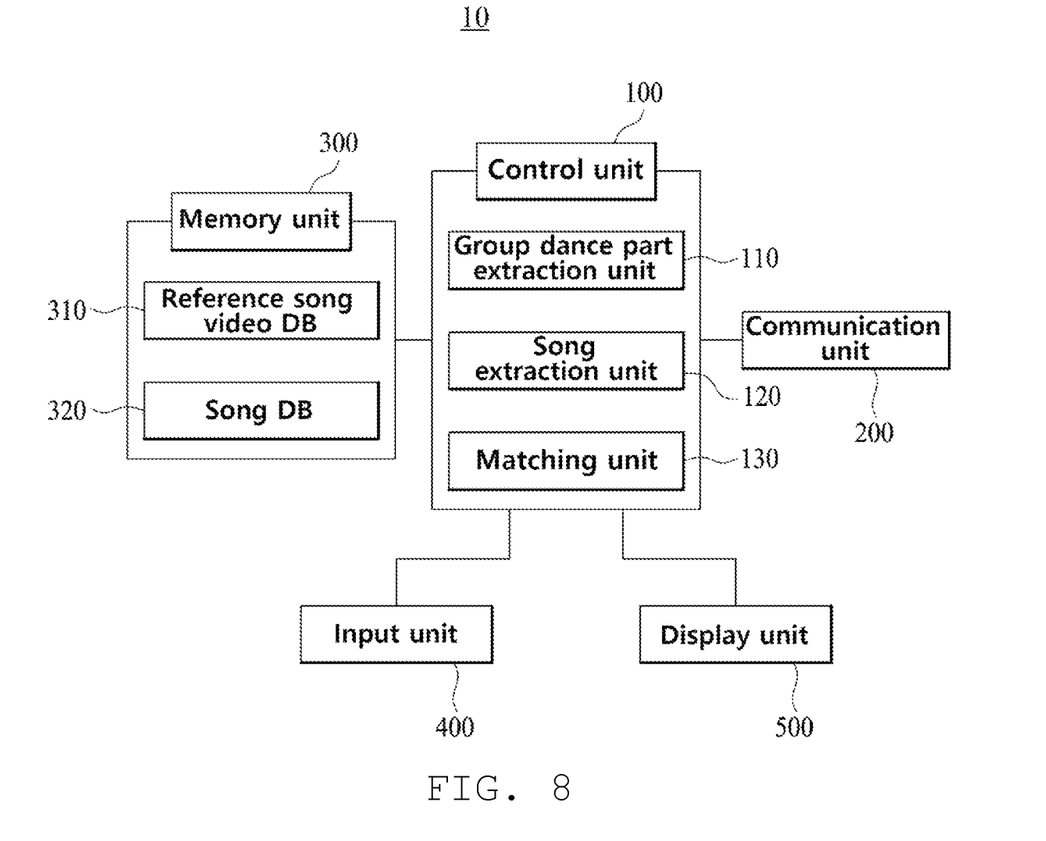
FIG. 8 is a schematic configuration diagram of a dance matching system according to another embodiment of the present disclosure.

FIG. 8 is a schematic configuration diagram of a dance matching system according to another embodiment of the present disclosure.

In the accompanying drawings, in order to more clearly express the technical spirit of the present disclosure, parts that are not related to the technical spirit of the present disclosure or that can be easily derived from those skilled in the art are simplified or omitted.

Throughout the specification, when a part is referred to as being "connected" to another part, it includes not only being "directly connected", but also being "electrically connected" by interposing the other part therebetween. In addition, when a part is said to "include" an element, this means that, unless specifically stated otherwise, the part further includes other elements, but does not exclude other elements. It should be understood that this does not preclude the possibility that one or more other features, numbers, steps, operations, elements, components, or combinations thereof may exist or may be added.

In the present specification, the term "unit" includes a unit realized by hardware, a unit realized by software, and a unit realized using hardware and software. In addition, one unit may be realized using two or more pieces of hardware, or two or more units may be realized using one piece of hardware.

In the present specification, some of the operations or functions described as being performed by a terminal or a device may instead be performed by a server connected to the terminal or the device. Similarly, some of the operations or functions described as being performed by a server may be performed by a terminal or a device connected to the server.

Hereinafter, a dance matching method according to an embodiment of the present disclosure will be described in detail with reference to FIGS. 1 to 8.

For example, the dance matching method may mean a method of evaluating a dance of a user on the basis of a reference song video of a dance of multiple dancers.

For example, the dance matching method may be realized by a dance matching system 10.

For example, as shown in FIG. 8, the dance matching system 10 may include a control unit 100, a communication unit 200, a memory unit 300, an input unit 400, and a display unit 500.

The control unit 100 may include a group dance part extraction unit 110, a song extraction unit 120, and a matching unit 130. The memory unit 300 may include a reference song video DB 310 and a song DB 320.

The dance matching system 10 will be described in detail while the dance matching method is described.

As shown in FIG. 1, the dance matching system 10, which realizes the dance matching method, may communicate with an external server P1 that stores a reference song video and/or a song sound source therein, and may also communicate with an electronic device P2 of a user.

For example, the electronic device P2 of the user may be a smartphone, a tablet PC, a desktop, or a wearable device, but there is no limitation on the type.

However, for convenience of description, the present disclosure will be described assuming that the electronic device P2 of the user is a smartphone equipped with a camera, a display, a speaker, and a communication device.

In the meantime, as shown in FIG. 3, the dance matching method may broadly include: receiving a reference song video in step S100; extracting a group dance part in step S200; extracting a song part in step S300; transmitting the song part in step S400; receiving a user dance video in step S500; calculating a matching rate in step S600; and transmitting the matching rate in step S700.

Hereinafter, each of the steps constituting the dance matching method will be described in detail.

The Step S100 of Receiving the Reference Song Video

The step S100 of receiving the reference song video may mean that the communication unit 200 receives the reference song video and/or the song sound source from the external server P1.

For example, the reference song video is a video of a dance of multiple dancers dancing to a predetermined song, and may mean a video including scenes of a singer (dancer) who sings the predetermined song and is dancing to the song.

The reference song video may be obtained from the external server P1, such as a sever of an entertainment company of the singer or a video providing server (e.g., YouTube), and may be stored in the reference song video DB 310.

In addition, the song sound source may mean a song sound source file corresponding to the reference song video.

That is, the song sound source may be a sound source file in which only a song, not a video, is stored.

The song sound source may also be obtained from the server of the entertainment company of the singer or the external server P1 providing the song sound source, and may be stored in the song DB 320.

The reference song video may be used in the step S200 of extracting the group dance part and/or the step S600 of calculating the matching rate, which will be described below.

For example, the reference song video may serve as a reference for evaluating a dance of a user, which will be described below.

The Step S200 of Extracting the Group Dance Part

The step S200 of extracting the group dance part may mean that the group dance part extraction unit 110 extracts the group dance part from the reference song video under a preset dance extraction condition.

The step S200 of extracting the group dance part may mean that according to the preset dance extraction condition, the group dance part that is a part of the all playback sections of the reference song video is extracted and the group dance part is defined.

For example, FIG. 4 is an exemplary diagram illustrating the reference song video obtained by the communication unit 200, and the reference song video may be a video with a playback duration from t0 to t1.

Herein, as shown in FIG. 4(a), at time point t2 in the reference song video, dance movements of multiple dancers in the video may be different from each other. As shown in FIG. 4(b), at time point t3, dance movements of multiple dancers in the video may be the same/similar to each other. As shown in FIG. 4(c), at time point t4, dance movements of multiple dancers in the video may be different from each other.

That is, during the entire playback duration from t0 and t1 in the reference song video, dance movements of multiple dancers at time point t3 may be the same/relatively similar to each other, compared to those at time points t2 and t4.

The step S200 of extracting the group dance part may mean extracting the time point at which dance movements of multiple dancers are the same/relatively similar to each other, compared to other playback time points.

That is, the preset dance extraction condition may mean a condition for extracting the group dance part on the basis of a dance matching rate (the rate at which the dance movements between multiple dancers are the same) between multiple dancers in the reference song video.

In the meantime, as shown in FIG. 2, a dance matching rate between multiple dancers may be calculated for all sections of the reference song video by the group dance part extraction unit 110 analyzing the skeleton movements of each dancer in the reference song video.

A technology for analyzing the skeleton for a person's motion in a video is already known, so a detailed description will be omitted.

In the meantime, hereinafter, the step S200 of extracting the group dance part will be described in more detail with reference to FIGS. 5 and 6.

For example, FIG. 5(a) is a graph resulting from calculating dance matching rates between multiple dancers in all playback sections of a predetermined first reference song video. FIG. 5(b) is a graph resulting from calculating dance matching rates between multiple dancers in all playback sections of a second reference song video different from the first reference song video.

As shown in FIGS. 5(a) and 5(b), the group dance part extraction unit 110 may calculate dance matching rates between multiple dancers for all playback sections of each reference song video.

Accordingly, the group dance part extraction unit 110 may calculate the dance matching rate graph for all playback sections.

Herein, the group dance part extraction unit 110 may extract a reference matching rate, which is a reference for extracting the group dance part, on the basis of the dance matching rates for all playback sections of the reference song video.

That is, the reference matching rate may be determined by the dance matching rates for all playback sections.

To describe this in more detail, as can be seen from comparison of FIGS. 5(a) and 5(b), the dance matching rates for all playback sections of the first reference song video, which corresponds to FIG. 5(a), may be higher than the dance matching rates for all playback sections of the second reference song video, which corresponds to FIG. 5(b).

Herein, the reference matching rate Z1 of the first reference song video, which corresponds to FIG. 5(a), may be determined using the dance matching rate having the highest value among the dance matching rates of the first reference song video.

That is, regarding the reference matching rate Z1 of the first reference song video, an average value of the dance matching rates for a section (the width of the section may vary) may be calculated, wherein the section is between at least 10 seconds and at most 20 seconds before and after the time point of the dance matching rate having the highest value in the first reference song video. The average value may be defined as the reference matching rate Z1 of the first reference song video.

Similarly, regarding the reference matching rate Z2 of the second reference song video corresponding to FIG. 5(b), an average value of the dance matching rates for a section may be calculated, wherein the section is between at least 10 seconds and at most 20 seconds before and after the time point of the dance matching rate having the highest value in the second reference song video. The average value may be defined as the reference matching rate Z2 of the second reference song video.

As a result, the reference matching rate Z1 of the first reference song video and the reference matching rate Z2 of the second reference song video may be different from each other.

Herein, the preset dance extraction condition may be a condition for extracting a dance part having the dance matching rates equal to and greater than the reference matching rate as the group dance part.

As a result, in FIG. 5(a), the group dance part in the first reference song video may be defined/calculated as a part from time point t5 to time point t6 having the dance matching rates equal to and greater than the reference matching rate Z1. In FIG. 5(b), the group dance part in the second reference song video may be defined/calculated as a part from time point t9 to time point t10 having the dance matching rates equal to and greater than the reference matching rate Z2.

In the meantime, FIG. 6 is a graph illustrating dance matching rates for a third reference song video different from the first reference song video and the second reference song video.

Herein, for example, the preset dance extraction condition may be a condition for extracting, when there are a plurality of dance parts having the dance matching rates equal to and greater than the reference matching rate, a dance part with the longest playback duration as the group dance part, among the plurality of dance parts.

To describe this in more detail, as shown in FIG. 6, the reference matching rate Z3 for the third reference song video may be calculated using the method described with reference to FIG. 5. As a result, there are a plurality of dance parts, specifically, from t0 to t13 and from t14 to t15, having the dance matching rates equal to and greater than the reference matching rate Z3 for the third reference song video.

Herein, when the time from t0 to t13 is shorter than the time from t14 to t15, the preset dance extraction condition may be a condition for defining/extracting the playback duration from t14 to t15 longer than the playback duration from t0 to t13 as the group dance part.

As a result, the group dance part extraction unit 110 may define/extract the section from t14 to t15 as the group dance part from the third reference song video.

It has been described that in the step S200 of extracting the group dance part, extraction is based on the dance matching rates. However, another embodiment will be described below with reference to FIG. 7.

For example, the group dance part extraction unit 110 may extract a group dance part from the reference song video under a preset dance extraction condition. Herein, the preset dance extraction condition may be a condition for extracting, as the group dance part, any one of the sections with the highest lyrics repetition rate in all playback sections of the reference song video.

To describe this in more detail, the group dance part extraction unit 110 may convert the song lyrics included in the reference song video into data. FIG. 7 shows that the lyrics of the reference song video is simply expressed in chronological order as group a, group b, group c, group d, group e, group f, group g, and group h.

For example, in the lyrics of the reference song video shown in FIG. 7, group d has the highest lyrics repetition rate when compared to the other groups.

As a result, the group dance part extraction unit 110 may extract, as the group dance part, any one of the sections of group d with the highest lyrics repetition rate in all playback sections of the reference song video.

Herein, as shown in FIG. 7, between start time point t0 and end time point t1 of the reference song video, there are a plurality of sections, k1, k2, and k3, of group d.

Herein, the preset dance extraction condition may be a condition for extracting the group dance part on the basis of dance matching rates between multiple dancers in the reference song video among the sections with the highest lyrics repetition rate.

That is, the group dance part extraction unit 110 may calculate the dance matching rates corresponding to each of the sections k1, k2, and k3, and may extract a section with the highest average value as the group dance part, among an average value of the dance matching rates of section k1, an average value of the dance matching rates of section k2, and an average value of the dance matching rates of section k3.

The Step S300 of Extracting the Song Part

The step S300 of extracting the song part may mean that the song extraction unit 120 extracts a song part corresponding to the group dance part extracted by the group dance part extraction unit 110.

For example, the step S400, which will be described below, of transmitting the song part does not transmit the entire song corresponding to the reference song video to the electronic device P2 of the user, but transmits the song part corresponding to the group dance part that is a partial section of the reference song video.

Accordingly, the step S300 of extracting the song part may mean extracting the song part of the section corresponding to the extracted group dance part.

The song extraction unit 120 may extract only the song part from the section of the group dance part extracted by the group dance part extraction unit 110.

For example, the song extraction unit 120 may extract only the song part corresponding to the section of the group dance part excluding pictures from the reference song video.

Alternatively, the song extraction unit 120 may extract the song sound source stored in the song DB 320 corresponding to the reference song video, and may extract the song part corresponding to the group dance part among all playback sections of the song sound source.

Herein, the song extraction unit 120 may define/extract, as the song part on the basis of the lyrics and melody of the group dance part, a section that has a section the same as or similar to the group dance part among all sections of the song sound source.

Herein, for example, the song extraction unit 120 may extract the song part that starts a preset period of time before the start time point of the extracted group dance part and ends a preset period of time after the end time point of the group dance part.

To describe this in more detail, as shown in FIG. 5(a), when the group dance part in the first reference song video is from t5 to t6, the song extraction unit 120 extracts t7, which is a preset period of time before the start time point t5 of the group dance part, and extracts t8, which is a preset period of time after the end time point t6 of the group dance part. As a result, the period of time from t7 to t8 may be extracted as the song part.

Similarly, as shown in FIG. 5(b), the song extraction unit 120 does not extract the group dance part, which is from t9 to t10, in the second reference song video as the song part. The song extraction unit 120 may extract the song part from t11 to t12 including the group dance part, wherein t11 is a preset period of time before the start time point of the group dance part and t12 is a preset period of time after the end time point of the group dance part.

As a result, in the step, which will be described below, S400 of transmitting the song part, the song part transmitted to the electronic device P2 of the user includes the group dance part and is a section longer than the group dance part.

The Step S400 of Transmitting the Song Part

The step S400 of transmitting the song part may mean that the communication unit 200 transmits the song part to the electronic device P2 in step S400 so that the electronic device P2 of the user plays the extracted song part.

For example, the user may use his or her electronic device P2 to request the dance matching system 10 to transmit the song part, and in response to the user's request, the dance matching system 10 may transmit the song part extracted by the song extraction unit 120 to the electronic device P2 of the user.

As a result, the electronic device P2 of the user may play the song part transmitted by the dance matching system 10.

The Step S500 of Receiving the User Dance Video

The step S500 of receiving the user dance video may mean that the communication unit 200 receives the user dance video from the electronic device P2 while the song part is played on the electronic device P2 of the user.

That is, the step S500 of receiving the user dance video may mean that the user dance video obtained when the electronic device P2 of the user plays the song part is received from the electronic device P2 by the dance matching system 10.

The Step S600 of Calculating the Matching Rate

The step S600 of calculating the matching rate may mean that the matching unit 130 calculates a matching rate between a dance of a user in the user dance video and a dance of a dancer in the reference song video.

To describe this in more detail, the matching unit 130 may compare the dance of the user in the user dance video obtained by the communication unit 200 to the dance of the dancer in the reference song video using the above-described skeleton analysis method.

When the dance of the user and the dance of the dancer are the same, the matching rate may be high. When the dances are not the same, the matching rate may be low.

Herein, the matching unit 130 may calculate the matching rate between the dance of the user and the reference dance in the reference song video only for the user dance video in the group dance part included in the user dance video in the song part.

To describe this in more detail, in FIG. 5(a), the song part played on the electronic device P2 of the user is the section from t7 to t8 and the group dance part is the section from t5 to t6.

Herein, the matching unit 130 may not calculate the matching rate for the user dance video corresponding to the section from t7 to t5 and the section from t6 to t8, but may calculate the matching rate only for the dance of the user in the user dance video corresponding to the section from t5 to t6 that is the group dance part through comparison to the reference dance in the reference song video.

In the meantime, when there are multiple dancers in the extracted group dance part of the reference song video, the matching unit 130 may compare the dance of the user to the dance of each dancer to calculate each matching rate, and may extract the highest matching rate, and may define the highest matching rate as the matching rate between the dance of the user in the user dance video and the dance of the dancer in the reference song video.

The matching rate may be calculated in "%", "high, middle, and low", or in the form of "pass/fail".

The Step S700 of Transmitting the Matching Rate

The step S700 of transmitting the matching rate may mean that the communication unit 200 transmits the matching rate to the electronic device P2 in step S700.

The matching rate calculated by the matching unit 130 may be transmitted to the electronic device P2 in real time by the communication unit 200, or may be transmitted as being an average value at the time point when the playing of the song part ends.

As a result, the user may recognize how similar his or her dance is to the dance of the dancer through his or her electronic device P2.

As described above, a dance matching method according to an embodiment of the present disclosure is capable of very easily extracting a group dance part for numerous reference song videos, and furthermore, is capable of matching a dance of a user with a group dance part and very easily calculating a matching rate with the group dance part.

The dance matching system 10 according to another embodiment of the present disclosure may be a system that realizes the dance matching method.

In addition, a recording medium according to another embodiment of the present disclosure may be a computer-readable recording medium on which a computer program for performing the dance matching method described above is recorded.

While the present disclosure has been described with reference to exemplary embodiments thereof, but is not limited thereto. It is apparent to those skilled in the art that various changes and modifications thereof may be made within the spirit and scope of the present disclosure, and therefore to be understood that such changes and modifications belong to the appended claims.

The invention claimed is:

1. A dance matching method for evaluating a dance of a user on the basis of a reference song video of a dance of multiple dancers by a dance matching system, the dance matching method comprising:
   extracting, by a group dance part extraction unit, a group dance part from the reference song video under a preset dance extraction condition;
   extracting, by a song extraction unit, a song part corresponding to the extracted group dance part;
   transmitting, by a communication unit, the song part to an electronic device of the user so that the electronic device plays the extracted song part;
   receiving, by the communication unit, a user dance video from the electronic device while the electronic device plays the song part;
   calculating, by a matching unit, a matching rate between a dance of the user in the user dance video and a dance of a dancer in the reference song video; and
   transmitting, by the communication unit, the matching rate to the electronic device,
   wherein the preset dance extraction condition is a condition for extracting the group dance part on the basis of dance matching rates between the multiple dancers in the reference song video,
   the group dance part extraction unit is configured to
      calculate the dance matching rates for all playback sections of the reference song video, and
      extract a reference matching rate, which is a reference for extracting the group dance part, on the basis of the dance matching rates for the all playback sections of the reference song video, and
   the preset dance extraction condition is a condition for extracting a dance part having the dance matching rates equal to and greater than the reference matching rate as the group dance part.

2. The dance matching method of claim 1, wherein the preset dance extraction condition is a condition for extracting, when there are a plurality of the dance parts having the dance matching rates equal to and greater than the reference matching rate, a dance part with the longest playback duration as the group dance part, among the plurality of the dance parts.

3. The dance matching method of claim 1, wherein the song extraction unit is configured to extract the song part that starts a preset period of time before a start time point of the extracted group dance part and ends a preset period of time after an end time point of the group dance part.

4. The dance matching method of claim 3, wherein the matching unit is configured to calculate the matching rate between the dance of the user and a reference dance in the reference song video only for the user dance video in the group dance part included in the user dance video in the song part.

5. A non-transitory computer-readable recording medium having a computer program recorded thereon, wherein the computer program is for performing a dance matching method according to claim 1.

6. A dance matching system for evaluating a dance of a user on the basis of a reference song video of a dance of multiple dancers, the dance matching system comprising:
   a group dance part extraction unit configured to extract a group dance part from the reference song video under a preset dance extraction condition;
   a song extraction unit configured to extract a song part corresponding to the extracted group dance part;
   a communication unit configured to transmit the song part to an electronic device of the user so that the electronic device plays the extracted song part, and to receive a user dance video from the electronic device while the electronic device plays the song part; and
   a matching unit configured to calculate a matching rate between a dance of the user in the user dance video and a dance of a dancer in the reference song video,
   wherein the preset dance extraction condition is a condition for extracting the group dance part on the basis of dance matching rates between the multiple dancers in the reference song video, and
   the group dance part extraction unit is configured to
      calculate the dance matching rates for all playback sections of the reference song video, and
      extract a reference matching rate, which is a reference for extracting the group dance part, on the basis of the dance matching rates for the all playback sections of the reference song video, and
   the preset dance extraction condition is a condition for extracting a dance part having the dance matching rates equal to and greater than the reference matching rate as the group dance part.

7. A non-transitory computer-readable recording medium having a computer program recorded thereon, wherein the computer program is for performing a dance matching method according to claim 2.

8. A non-transitory computer-readable recording medium having a computer program recorded thereon, wherein the computer program is for performing a dance matching method according to claim 3.

9. A non-transitory computer-readable recording medium having a computer program recorded thereon, wherein the computer program is for performing a dance matching method according to claim 4.

* * * * *